US007448070B2

(12) United States Patent
Barkley et al.

(10) Patent No.: US 7,448,070 B2
(45) Date of Patent: Nov. 4, 2008

(54) NETWORK FINGERPRINTING

(75) Inventors: Warren V. Barkley, Mill Creek, WA (US); Vivek Bhanu, Bellevue, WA (US); Sean Lyndersay, Seattle, WA (US); Timothy M. Moore, Bellevue, WA (US); Yinghua Yao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 10/688,656

(22) Filed: Oct. 17, 2003

(65) Prior Publication Data

US 2005/0086473 A1      Apr. 21, 2005

(51) Int. Cl.
*G06F 17/30* (2006.01)
(52) U.S. Cl. .................................. 726/4; 726/3; 726/11
(58) Field of Classification Search .................. 726/6, 726/3, 5, 4, 11; 713/153
See application file for complete search history.

(56) References Cited

U.S. PATENT DOCUMENTS

| 6,182,226 B1 | 1/2001 | Reid et al. |
| 6,434,613 B1 | 8/2002 | Bertram et al. |
| 6,480,963 B1 | 11/2002 | Tachibana et al. |

OTHER PUBLICATIONS

VMesh: Distributed Segment Storage for Peer-to-Peer Interactive Video Streaming Yiu, W.-P.K.; Xing Jin; Chan, S.-H.G.; Selected Areas in Communications, IEEE Journal on vol. 25, Issue 9, Dec. 2007 pp. 1717-1731 Digital Object Identifier 10.1109/JSAC.2007.071210.*

Modular Multilayer Perceptron for WLAN Based Localization Ahmad, U.; Gavrilov, A.; Sungyoung Lee; Young-Koo Lee; Neural Networks, 2006. IJCNN '06. International Joint Conference on Jul. 16-21, 2006 pp. 3465-3471.*

Lateral error recovery for media streaming in application-level multicast Yiu, W.-P.K.; Wong, K.-F.S.; Chan, S.-H.G.; Wan-Ching Wong; Qian Zhang; Wen-Wu Zhu; Ya-Qin Zhang; Multimedia, IEEE Transactions on vol. 8, Issue 2, Apr. 2006 pp. 219-232.*

European Search Report for Application No. EP 04 01 9631 dated Apr. 11, 2006.

(Continued)

*Primary Examiner*—David Jung
(74) *Attorney, Agent, or Firm*—Marshall, Gerstein & Borun LLP

(57) ABSTRACT

A network fingerprinting component for a computerized system issues network identifiers (NID) for computer networks. Identity confidences may be determined for each issued network identifier with respect to current computer networks. Computer network attributes may include passive network attributes and active network attributes. Retrieving values for active network attributes involves generating network traffic. As a result passive network attributes may be available to the network fingerprinting component before active network attributes. Learned identity confidence modifiers may be applied to identity confidences determined independent of active network attributes to achieve more accurate identity confidence sooner. Better learned identity confidence modifiers may be obtained by comparing identity confidences for a particular computer network determined independently of active network attributes with identity confidences for the computer network determined once active network attributes become available and then adjusting the learned identity confidence modifiers so as to minimize any differences.

18 Claims, 11 Drawing Sheets

OTHER PUBLICATIONS

Labuschagne et al. "The Use of Real-Time Risk Analysis to Enable Dynamic Activation of Countermeasures," Computers & Security, Elsevier Science Publishers, Amsterdam, NL vol. 17, No. 4, 1998, pp. 347-357.

Yesberg et al., "QuARC: Expressive Security Mechanisms" New Security Paradigms Workshop, 1995, Proceedings La Jolla, CA, pp. 34-40.

European Search Report for Application No. EP 04 01 9631 dated Feb. 20, 2006.

MSDN, "Network Location Awareness Service Provider (NLA)", *Windows Sockets 2 SDK*, 8 pgs, printed at http://msdn.microsoft.com/library/default.asp?url=/library/en-us/winsock/winsock/network_location_awareness_service_provider_nla_2.asp (Feb. 2003).

Valian, Peter and Todd K. Watson, "NetReg: An Automated DHCP Registration System", *Proceedings of LISA '99: 13th System Administration Conference and Exhibition*, pp. 139-147 (1999).

* cited by examiner

NETWORK FINGERPRINTING

FIELD OF THE INVENTION

This invention-pertains generally to computer networks and, more particularly, to computer network identity.

BACKGROUND OF THE INVENTION

Modern computers communicate with each other over a variety of computer networks. Mobile computers may utilize several computer networks in a day. Even fixed-location computers may have access to multiple computer networks, for example, to achieve increased reliability through redundancy, to take advantage of cost differentials between computer networks, or for changing communications security requirements.

A computer, a computer operating system, and/or a communications application may need to change its configuration based upon the computer network or networks to which it is connected. Some conventional methods of differentiating between computer networks are ad hoc or limited to particular network types. In a modern heterogeneous networking environment, this may result in configuration inconsistencies and, ultimately, confusion and frustration for users of computer systems.

Some conventional methods of differentiating between computer networks provide ambiguous results without providing information regarding the level of ambiguity. Such methods may be unsuitable, particularly for security conscious applications. In addition, it may be that access to network services is denied, for example, for security reasons, until the level of ambiguity is sufficiently low. As a result, it is desirable that network disambiguation be fast and efficient.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, one or more connections are established to one or more computer networks. A network identifier may be issued for each computer network. An identity confidence may be determined for each issued network identifier with respect to one or more current computer networks.

In an embodiment of the invention, a first set and a second set of identity confidences are determined. Determining the first set of identity confidences includes applying one or more of a set of learned identity confidence modifiers to one or more of the identity confidences of the first set. Determining the second set of identity confidences includes applying one or more of a set of active network attribute identity confidence modifiers to one or more of the identity confidences of the second set. The set of learned identity confidence modifiers may be adjusted so that if the first set of identity confidences were to be re-determined then differences between the re-determined first set of identity confidences and the second set of identity confidences would be minimized.

In an embodiment of the invention, a computerized system includes a network fingerprinting component. The network fingerprinting component may be configured to issue one or more network identifiers for one or more computer networks. The network fingerprinting component may be configured to maintain a set of issued network identifiers. The network fingerprinting component may be further configured to maintain a set of current identity confidences. The set of current identity confidences may include an identity confidence for each issued network identifier with respect to one or more current computer networks.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
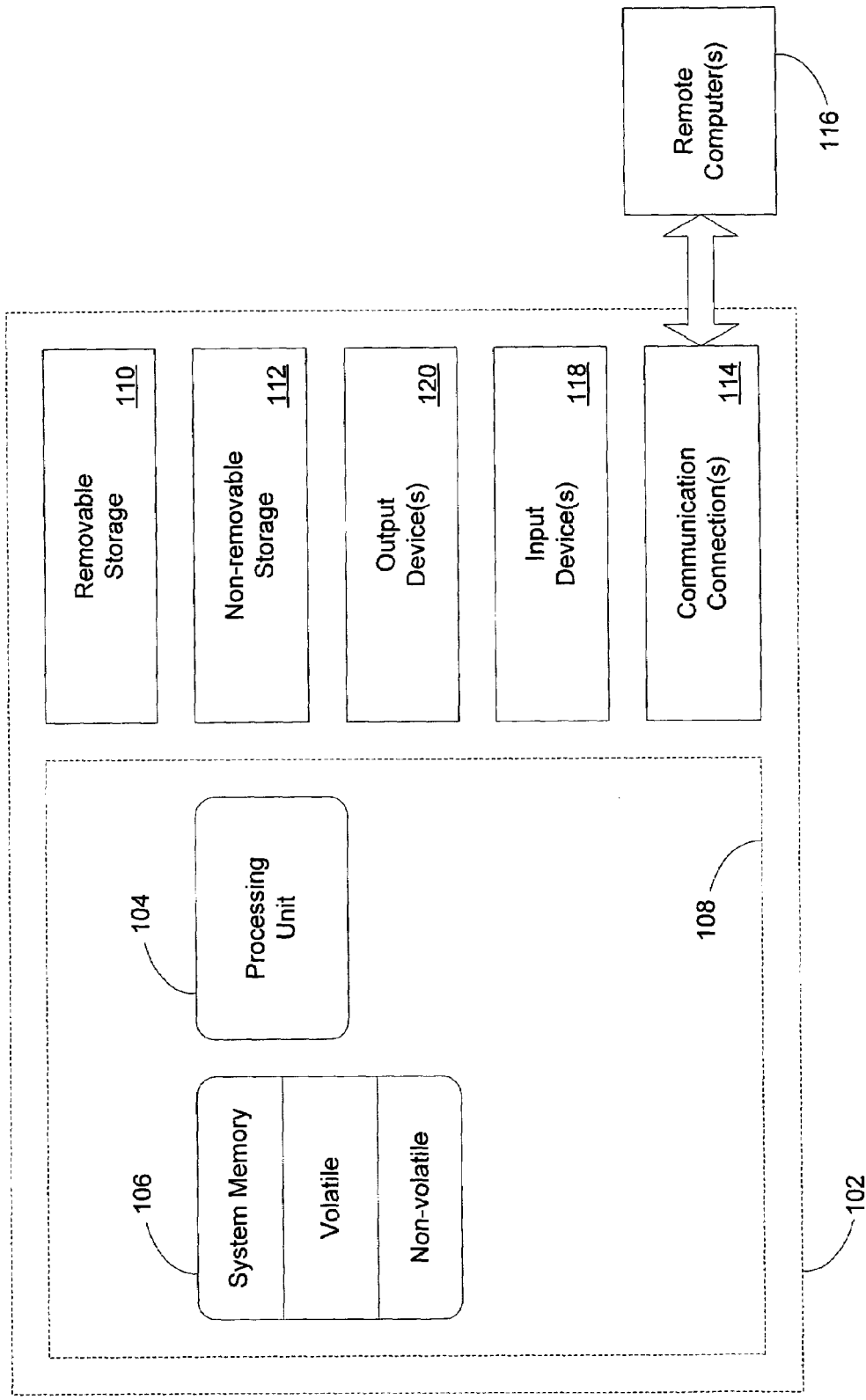
FIG. 1 is a schematic diagram generally illustrating an exemplary computer system usable to implement an embodiment of the invention.
Figure 2:
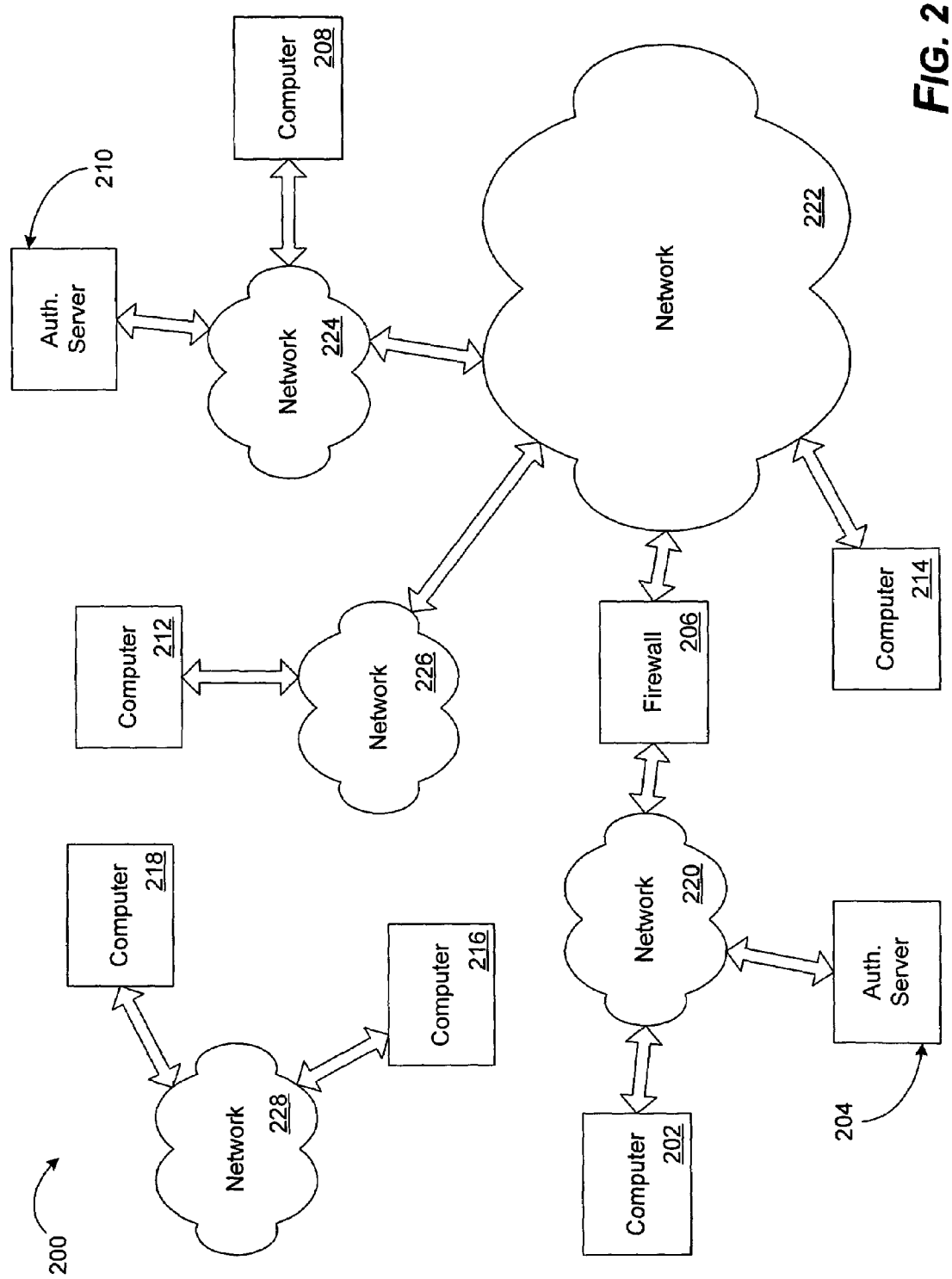
FIG. 2 is a schematic diagram illustrating computers variously connected by computer networks.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 2 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

An example of a computer networking environment suitable for incorporating aspects of the invention is described with reference to FIG. 2. The example computer networking environment 200 includes several computers 202, 204, 206, 208, 210, 212, 214, 216, 218 (e.g., each may be the computer 102 as described above with reference to FIG. 1) communicating with one another over several computer networks 220, 222, 224, 226, 228, each represented by a cloud. Each computer network 220, 222, 224, 226, 228 may include many well-known components, such as routers, gateways, hubs, etc. and may allow the computers 202, 204, 206, 208, 210, 212, 214, 216, 218 to communicate via wired and/or wireless media. When interacting with one another over computer networks 220, 222, 224, 226, 228, one or more of the computers 202, 204, 206, 208, 210, 212, 214, 216, 218 may act as clients, servers or peers with respect to other computers 202, 204, 206, 208, 210, 212, 214, 216, 218. Accordingly, the various embodiments of the invention may be practiced on clients, servers, peers or combinations thereof, even though specific examples contained herein may not refer to all of these types of computers.

The computer 202 is connected to the computer network 220. An authentication (Auth.) server 204 is also connected to the computer network 220. Authentication servers are known in the art, so only some of their features are highlighted here. The authentication server 204 is a type of computer (typically having an authentication server application or operating system component executing on the computer) that provides authentication services, for example, issuing authentication tokens to computers that successfully authenticate or locally maintaining an authoritative authentication state. A computer network policy, for example a security policy, may require that a computer successfully authenticate before being granted further access to network services and resources such as files, databases, directories, printers and so on. A Microsoft® Windows® XP server configured as a domain controller is an example of an authentication server.

The computer network 220 is connected to the computer network 222 by a firewall 206. Firewalls are known in the art, so only some of their features are highlighted here. The firewall 206 is a type of computer (typically having a firewall application or operating system component executing on the computer) that enforces a computer network traffic policy, for example a security policy, with regard to computer network traffic arriving at the firewall. For example, the firewall 206 may permit some types of computer network traffic to pass from the computer network 222 to the computer network 220 but block other types.

The computer 208 is connected to the computer network 224. The authentication server 210 is also connected to the computer network 224. The computer network 224 is connected to the computer network 222. The computer 212 is connected to the computer network 226. The computer network 226 is connected to the computer network 222. The cloud representing computer network 222 is larger than the clouds representing computer networks 220, 224, 226 and 228 to indicate that the computer network 222 is a computer network over which other computer networks communicate (i.e., is an inter-network), for example, the computer network 224 and the computer network 226 communicate over the computer network 222. The computer 214 is connected to the computer network 222. The computer 216 and the computer 218 are connected to the computer network 228. The computer network 228 is not connected to the other computer networks 220, 222, 224, 226 of FIG. 2.

Figure 3:
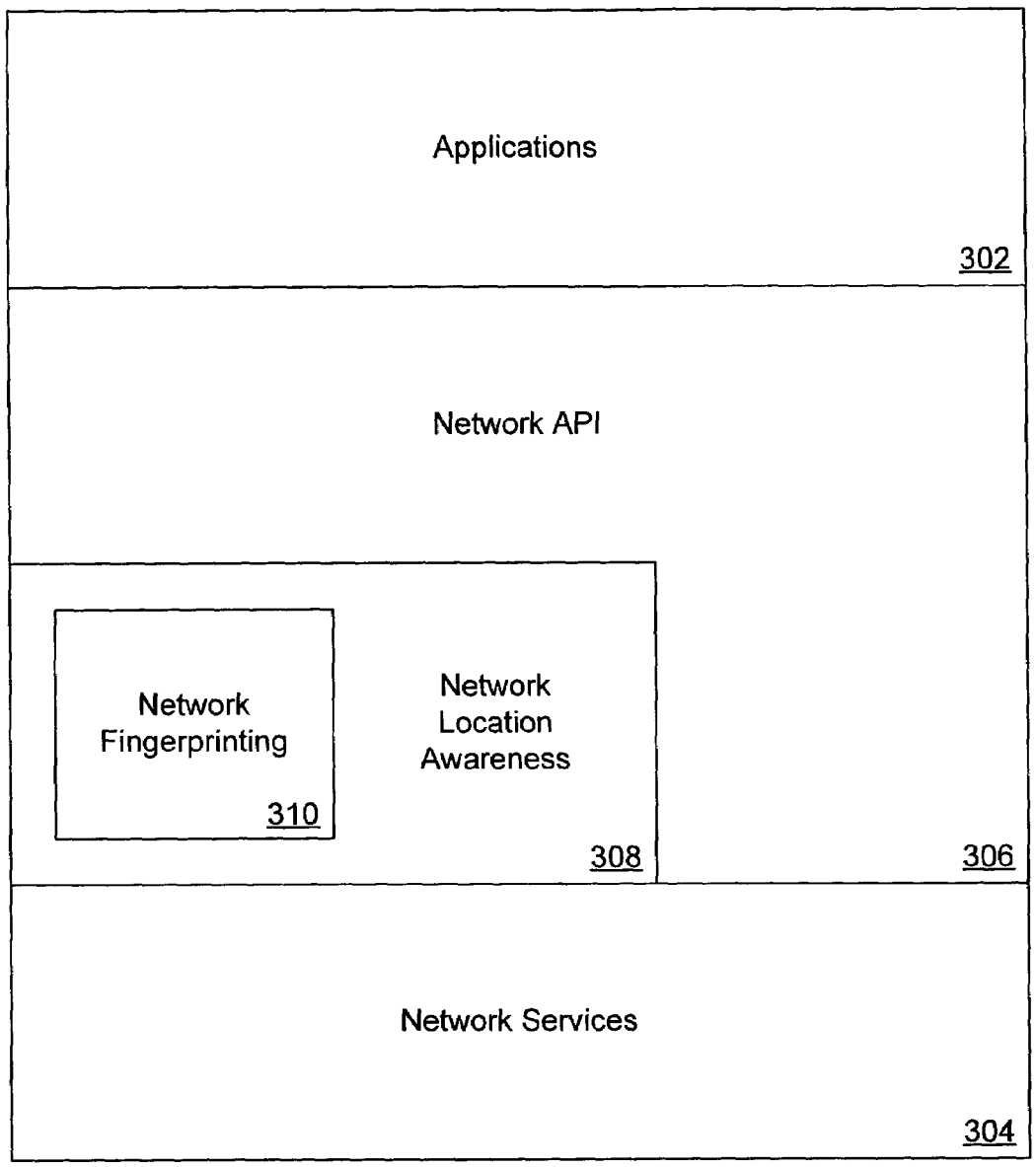
FIG. 3 is a schematic diagram illustrating an example high level systems architecture in accordance with an embodiment of the invention.

FIG. 3 depicts an example high level systems architecture suitable for incorporating aspects of the invention. Applications 302 take advantage of network services 304 through a network application programming interface (API) 306. The network API 306 includes a network location awareness (NLA) component 308. The NLA component 308 includes a network fingerprinting component 310.

Network services 304 include basic computer network services such as the establishment and maintenance of communication connections 114 (FIG. 1). Network services 304 include services provided by low level communications devices and protocols such as devices and protocols in accordance with the Institute of Electrical and Electronics Engineers (IEEE) 802.1x series of communications standards, the Internet protocol (IP), the transmission control protocol (TCP), for example. Network services 304 may further include computer network infrastructure services such as the services provided by the dynamic host configuration protocol (DHCP), the Internet domain name system (DNS) and the like. Network services 304 may also includes higher level communications services such as those provided by a distributed component object model (DCOM) and the like. Each of these network service examples is well known in the art and need not be detailed here. For details of an example distributed component object model see the DCOM section of the Microsoft® Developer Network (MSDN®) Library.

Network application programming interfaces are known in the art. Windows Sockets 2 (Winsock), as detailed in the Windows Sockets 2 section of the February 2003 Microsoft® Windows® Platform Software Development Kit (SDK) documentation in the MSDN® Library, is an example of a suitable network API 306. The network location awareness component 308 of the network API 306 retrieves and monitors computer network attributes. Applications 302 may access the computer network attributes through the network API 306 and register with the network location awareness component 308 for notification of changes to the computer network attributes. Network location awareness is known in the art, so only some of its features are highlighted here. For details of an example network location awareness component, see the Network Location Awareness Service Provider section of the February 2003 Microsoft® Windows® Platform SDK documentation in the MSDNE® Library.

Examples of computer network attributes that may be retrieved and monitored by the NLA component 308 include low level communications device operating parameters, for example, media access control (MAC) addresses of wireless access points in accordance with the IEEE 802.11 series of wireless communications standards. Communications protocol operating parameters such as IP addresses and IP subnet specifications may also be retrieved and monitored by the NLA component 308.

Additional computer network attributes may include infrastructure service configuration and operating parameters such as the network addresses of default gateways, DHCP servers, authentication servers, DNS and other name servers, as well as authentication domain name, server names, unique server identifiers, for example, globally unique identifiers (GUIDs), and the physical location of servers and/or network elements, for example, as determined by a global positioning system. The NLA component 308 may retrieve and monitor any suitable network services 304 configuration or operating parameter.

The NLA component 308 may retrieve parameters directly from the network services 304 or through the network API 306. Computer network attributes such as network services 304 configuration and operating parameters may be classified as passive or active. In an embodiment of the invention, computer network traffic, for example, a pair of request and response messages, is generated by the NLA component 308 when retrieving active network attributes (ANA), but retrieving passive network attributes (PNA) does not generate computer network traffic. Communication media connected status, IP address, IP subnet and default gateway network address are each examples of passive network attributes. In an embodiment of the invention, passive network attributes are computer network attributes that are present prior to the establishment of an active communications connection. Examples of active network attributes include authentication state (e.g., from an authoritative remote authentication server) and other network service attributes maintained by remote network service providers, in particular, remote network service presence. It may take the NLA component 308 more time to retrieve and/or detect changes in active network attributes than passive network attributes.

Different computer networks may have some of the same computer network attributes. For example the computer network 220 and the computer network 228 of FIG. 2 may utilize the same private IP subnet (e.g., 192.168.1.0/24). The computer network attributes of a particular computer network may change over time. For example, the number of wireless access points in the computer network 226 (FIG. 2) may change over time. These characteristics of computer networks are part of the reason why it may be a challenge to unambiguously determine an identity of a particular computer network.

The network fingerprinting component 310 determines a computer network identifier (NID), e.g., a GUID, for each computer network of which the network location awareness component 308 becomes aware. In an embodiment of the invention, the network fingerprinting component 310 further determines a level of confidence for each network identifier (an "identity confidence") with respect to various computer networks. The identity confidence of a particular network identifier may be a probability of correct identification of one of the computer networks of which the network location awareness component 308 is aware. For example, the identity confidence may have a value between a minimum identity confidence value (e.g., 0%) and a maximum identity confidence value (e.g., 100%). The identity confidence may have values on a quantized scale such as a scale of 0 (no confidence) to 5 (highest confidence).

The identity confidence of a particular network identifier may be based upon comparison of current and previous sets of network attributes. The network fingerprinting component 310 may have access to each network attribute retrieved by the network location awareness component 308. The network fingerprinting component 310 may subscribe to changes to network attributes monitored by the network location awareness component 308. It may be that some computer networks do not possess particular computer network attributes that may be utilized as part of determining identity confidence, for example, some compute networks may not include an authentication server. One or more of the highest levels of identity confidence may not be available for such computer networks.

In response to a request for an identity of one of the computer networks of which the network location awareness component 308 is aware, for example, a request generated by one of the applications 302, the network fingerprinting component 310 may respond with a response set of network identifiers as well as the identity confidence of each network identifier. For example, the response set of network identifiers may be sorted in order of descending identity confidence of the network identifiers. In an embodiment of the invention, computers incorporating the network fingerprinting component 310 may exchange information regarding identified networks (e.g., network identifiers) with their neighbors, enabling a shared network map.

Figure 4:
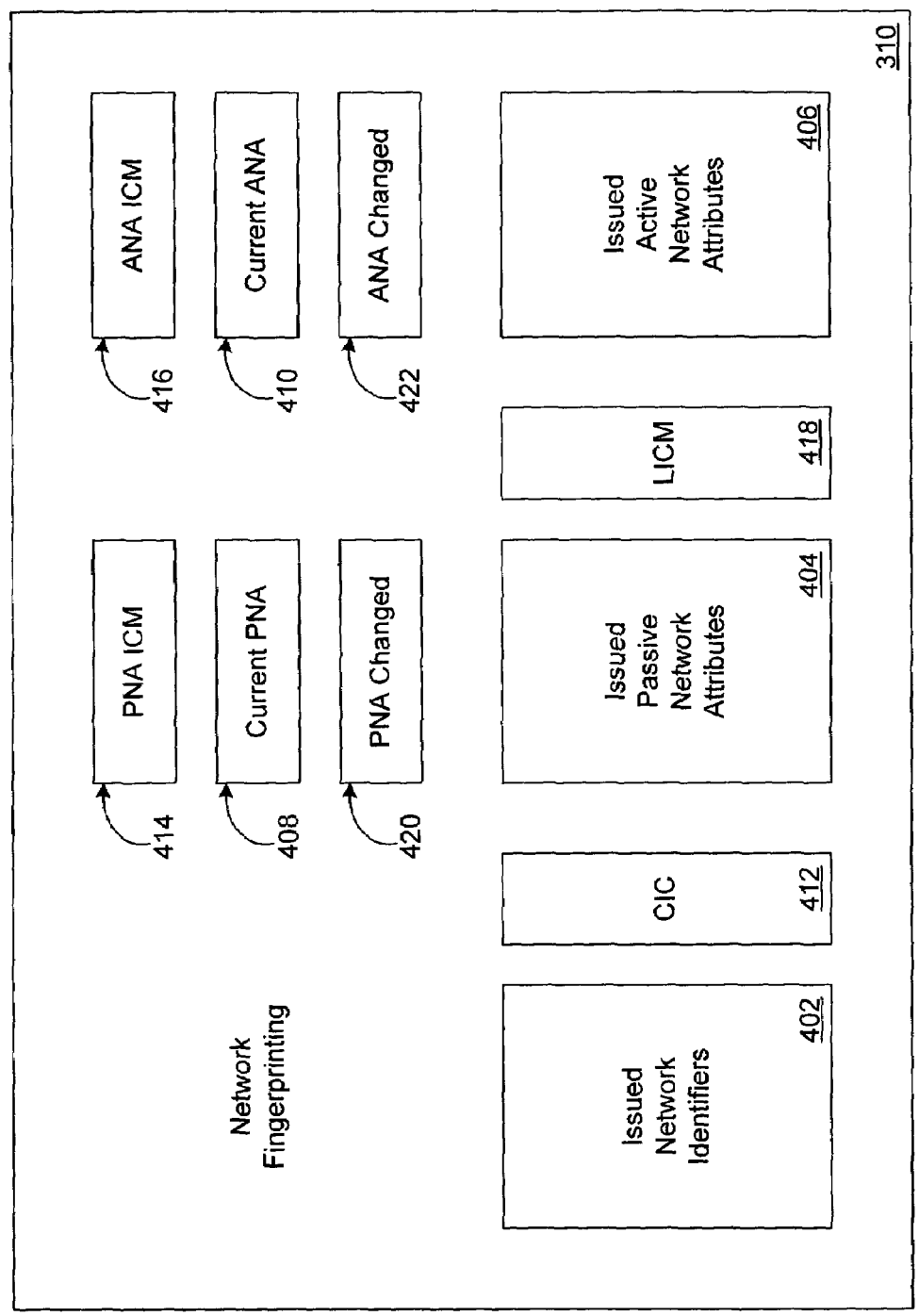
FIG. 4 is a schematic diagram illustrating an example network fingerprinting component architecture in accordance with an embodiment of the invention.

FIG. 4 depicts an example network fingerprinting component 310 architecture in accordance with an embodiment of the invention. Data structures maintained by the network fingerprinting component 310 include a set of issued network identifiers 402, a set of issued passive network attributes 404 and a set of issued active network attributes 406. Each issued network identifier may be associated with a set of passive network attributes and may be further associated with a set of active network attributes. The set of issued passive network attributes 404 may contain the sets of passive network attributes associated with the issued network identifiers 402.

The set of issued active network attributes 406 may contain the sets of active network attributes associated with the issued network identifiers 402.

Data structures maintained by the network fingerprinting component 310 further include a set of current passive network attributes (PNA) 408 and a set of current active network attributes (ANA) 410. At a particular instant, each computer network connected to the computer(s) incorporating the network fingerprinting component 310 has a particular set of passive network attributes and a particular set of active network attributes. At that particular instant, those passive network attributes available to the network fingerprinting component 310 (i.e., available from the network location awareness component 308 of FIG. 3 in this example) may be contained by the set of current passive network attributes 408. Those active network attributes available to the network fingerprinting component 310 at that particular instant may be contained by the set of active network attributes 410.

Data structures maintained by the network fingerprinting component 310 further include a set of current identity confidences (CIC) 412, a set of passive network attribute (PNA) identity confidence modifiers (ICM) 414, a set of active network attribute (ANA) identity confidence modifiers (ICM) 416 and a set of learned identity confidence modifiers (LICM) 418. In an embodiment of the invention, a current identity confidence is determined for each issued network identifier by applying identity confidence modifiers to a base confidence (e.g., 0%). Passive network attribute identity confidence modifiers 414 may be applied to current identity confidences 412 when current passive network attributes 408 match corresponding issued passive network attributes 404. Active network attribute identity confidence modifiers 416 may be applied to current identity confidences 412 when current active network attributes 410 match corresponding issued active network attributes 406. Learned identity confidence modifiers 418 may be applied to current identity confidences 412 to modify current identity confidences 412 determined independently of current active network attributes 410. Unless otherwise indicated below or clearly contradicted by context, computer network and other attributes may match if the difference between the attribute values is within a matching tolerance.

Data structures maintained by the network fingerprinting component 310 further include a set of passive network attribute (PNA) changed indicators 420 and a set of active network attribute (ANA) changed indicators 422. The set of passive network attribute changed indicators 420 may include one or more timestamps indicating when current passive network attributes 408 were last updated, one or more Booleans indicating that corresponding current passive network attributes 408 have changed since current identity confidences 412 were last determined, or any suitable attribute change indicator that helps avoid duplicate determinations of identity confidence. The set of active network attribute changed indicators 422 may include similar change indicators.

The passive network attributes identity confidence modifiers 414, the current passive network attributes 408, the passive network attributes changed indicators 420 and the issued passive network attributes 404 data structures are depicted in a passive network attributes column. Each data structure in the passive network attributes column may have a corresponding entry for each passive network attribute. The active network attributes identity confidence modifiers 416, the current active network attributes 410, the active network attributes changed indicators 422 and the issued active network attributes 406 data structures are depicted in an active network attributes column. Each data structure in the active network attributes column may have a corresponding entry for each active network attribute. The issued network identifiers 402, the current identity confidences 412, the issued passive network attributes 404, the learned identity confidence modifiers 418 and the issued active network attributes 406 are depicted in an issued network identifiers row. Each data structure in the issued network identifiers row may have a corresponding entry for each issued network identifier. As will be apparent to one of skill in the art, the data structures depicted in FIG. 4 may be maintained in one or more tables of a relational database, for example.

In an embodiment of the invention, a key use for network identifiers is as an index to network-dependent configurations and/or policies, for example, security policies. Such configurations and policies may be referenced early in an initialization of the computer incorporating the network fingerprinting component 310, for example, prior to enabling any network interface hardware and/or communication connections 114 (FIG. 1). The network fingerprinting component 310 may receive requests for network identifiers frequently as part of the initialization, for example, 100 requests within 2 minutes. This computer initialization scenario is not necessarily the most important operating scenario for the network fingerprinting component 310 but it does help provide context for the following discussion with regard to methods of associating network identifiers with computer networks.

Figure 5:
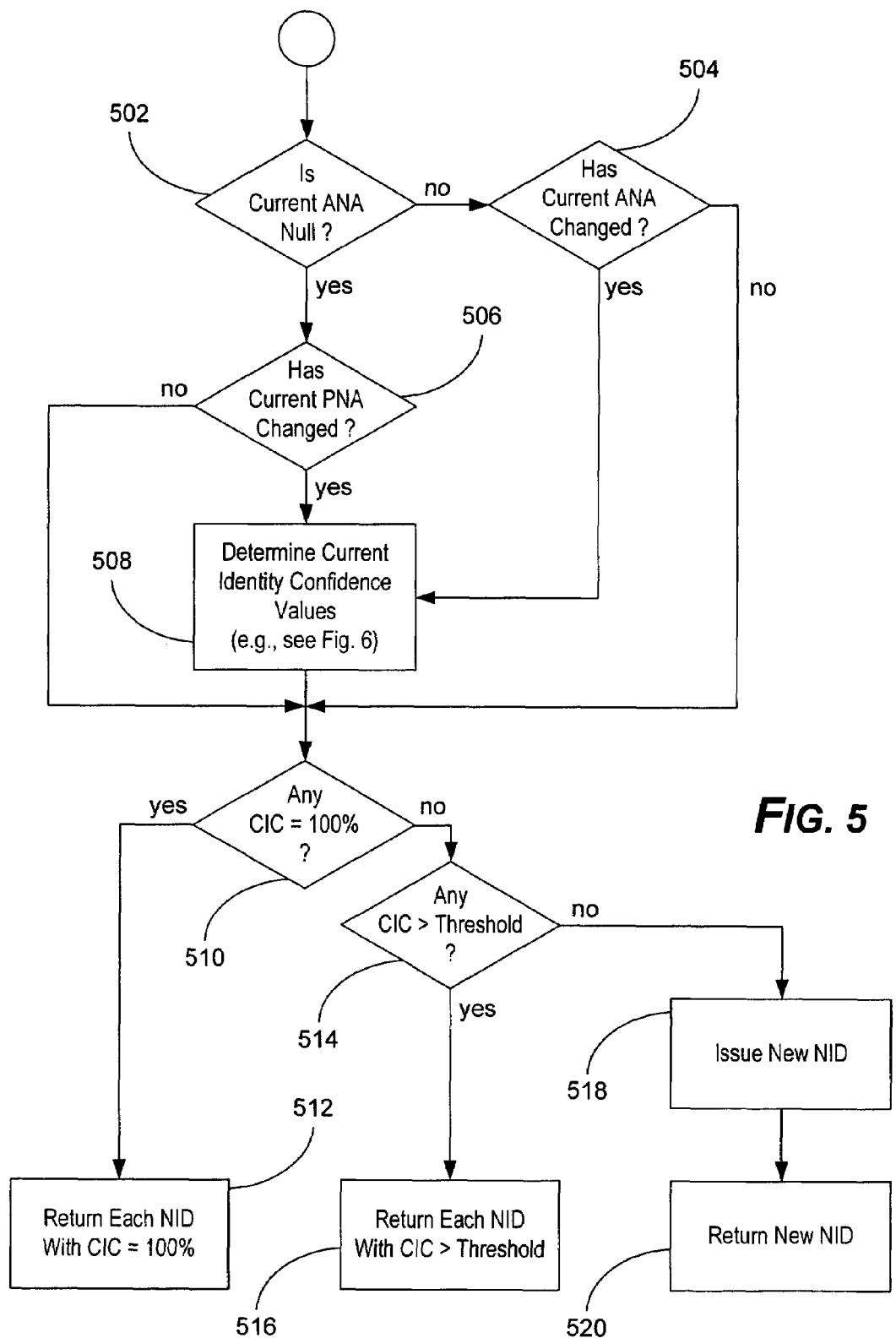
FIG. 5 is a flowchart depicting example steps for responding to a request for network identifiers in accordance with an embodiment of the invention.

FIG. 5 depicts example steps in accordance with an embodiment of the invention that may be performed in response to a request for network identifiers. The steps depicted in FIG. 5 may be performed for each computer network of which the network location awareness component 308 is currently aware (each "current computer network"). One or more network identifiers may be added to the response set (returned) for each computer network with at least one network attribute of which the network location awareness component 308 is aware.

The network fingerprinting component 310 typically subscribes to less than each of the network attributes of which the network location awareness component 310 is aware. For example, the network fingerprinting component 310 may subscribe to three passive network attributes such as network interface hardware MAC address, IP subnet and authentication domain name, and two active network attributes such as remote authentication server presence and authentication state with the remote authentication server. When the network location awareness component 308 initially becomes aware of, or retrieves an updated value for, the network attributes in which the network fingerprinting component 310 is interested, the network location awareness component 308 may pass the new or updated value to the network fingerprinting component 310.

The network fingerprinting component 310 may add new or updated passive network attributes to the current passive network attributes 408 (FIG. 4) and update corresponding passive network attributes changed indicators 420. The network fingerprinting component 310 may add new or updated active network attributes to the current active network attributes 410 and update corresponding active network attributes changed indicators 422. The current passive network attributes 408 may become available for a particular computer network before the current active network attributes 410 become available. As a result, at step 502, the network fingerprinting component 310 determines if the current active network attributes 410 for the computer network have become available or if they are as yet undetermined (i.e., null). If the current active network attributes 410 for the computer network have become available (i.e., they are not null) then the procedure progresses to step 504. Otherwise, the procedure progresses to step 506.

At step 504, it is determined if the current active network attributes 410 (FIG. 4) have changed since the current identity confidences 412 were last calculated, for example, by checking the active network attribute changed indicators 422. If the current active network attributes 410 have changed then the procedure progresses to step 508 where the current identity confidences 412 are determined. Otherwise, step 508 may be skipped and the procedure may progress to step 510.

At step 506, it is determined if the current passive network attributes 408 (FIG. 4) have changed since the current identity confidences 412 were last calculated, for example, by checking the passive network attribute changed indicators 420. If the current passive network attributes 408 have changed then the procedure progresses to step 508. Otherwise, step 508 may be skipped and the procedure may progress to step 510.

At step 508, the current identity confidences 412 (FIG. 4) for the computer network are determined. Example steps for determining the current identity confidences 412 are described in more detail below with reference to FIG. 6. At step 510, it is determined if any of the current identity confidences 412 for the computer network have the maximum identity confidence value (e.g., 100%). If one or more of the current identity confidences 412 for the computer network have the maximum value then the procedure progresses to step 512. Otherwise the procedure progresses to step 514. At step 512, those issued network identifiers 402 with current identity confidences 412 at the maximum value are added to the response set (are returned to the requester).

At step 514, it is determined if any of the current identity confidences 412 (FIG. 4) for the computer network have values above a minimum identity confidence response threshold (e.g., 50%). If one or more of the current identity confidences 412 for the computer network do have values above the minimum identity confidence response threshold then the procedure progresses to step 516. Otherwise, the procedure progresses to step 518. At step 516, those issued network identifiers 402 with current identity confidences 412 above the minimum identity confidence response threshold are added to the response set (are returned to the requester).

At step 518, a new network identifier is issued. For example, the network fingerprinting component may generate a new network identifier and add the new network identifier to the issued network identifiers 402 (FIG. 4). The values of the issued passive network attributes 404 and the issued active network attributes 406 associated with the new network identifier may be the values of the current passive network attributes 408 and the current active network attributes 410 (respectively) utilized in determining the current identity confidences 412 for the computer network. The values of the current identity confidence and learned identity confidence modifier(s) associated with the new network identifier may be their respective default values. At step 520, the new network identifier is added to the response set (i.e., is returned to the requester). The identity confidence returned for the new network identifier may be a special value not normally returned, e.g., 0%, to indicate that it is a new network identifier (i.e., a previously unknown computer network) and not one of the previously issued network identifiers (i.e., one of the previously identified computer networks).

Figure 6:
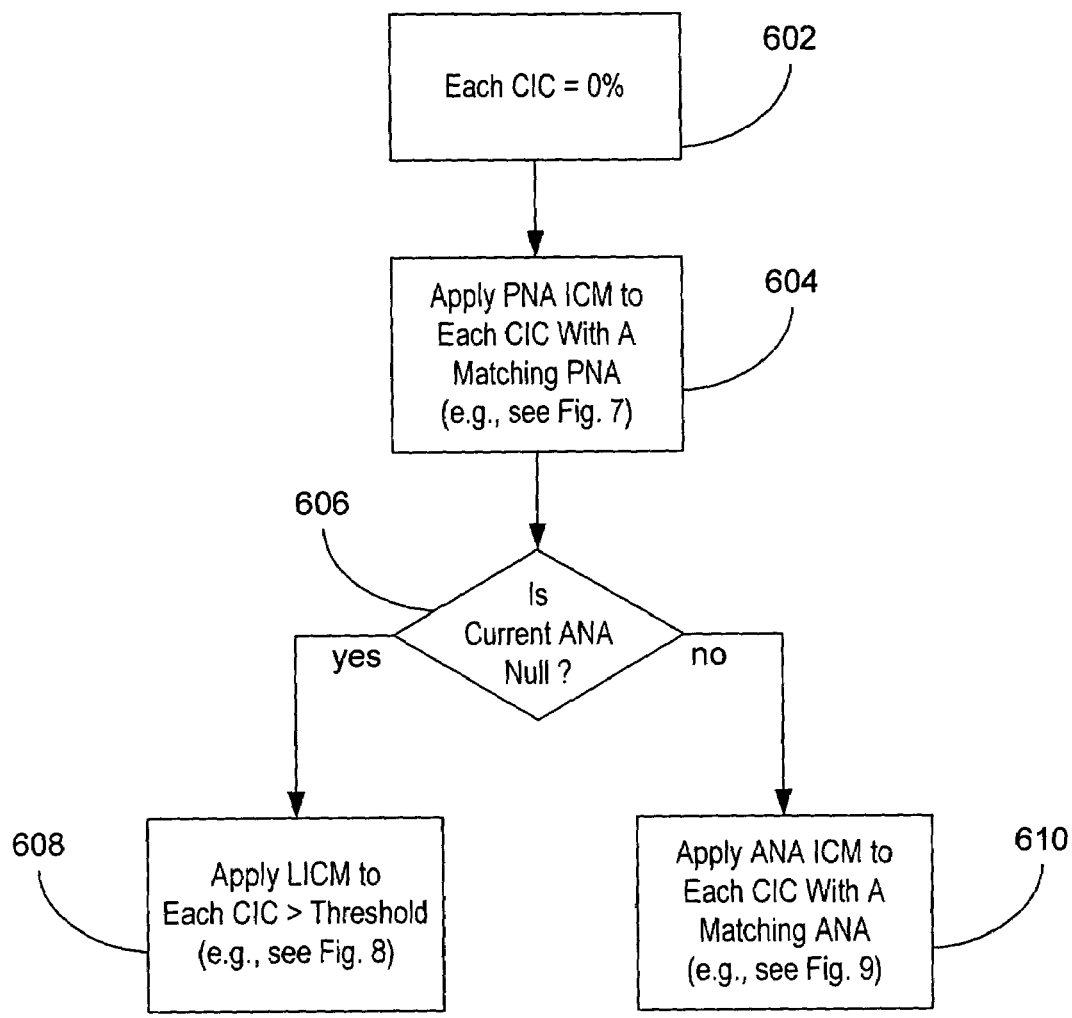
FIG. 6 is a flowchart depicting example steps for determining current identity confidences for a computer network in accordance with an embodiment of the invention.

FIG. 6 depicts example steps for determining current identity confidence values for a particular computer network in accordance with an embodiment of the invention. At step 602, each current identity confidence associated with the issued network identifiers 402 (FIG. 4) is reset to an initial identity confidence value, for example, 0%. At step 604, passive network attribute identity confidence modifiers 414 are applied to each current identity confidence associated with issued passive network attributes 404 that match the current passive network attributes 408. An example procedure for applying passive network attribute identity confidence modifiers in accordance with an embodiment of the invention is described below with reference to FIG. 7.

Having applied the passive network attribute identity confidence modifiers 414 (FIG. 4), the procedure progresses to step 606. At step 606, it is determined if the current active network attributes 410 for the computer network have become available or if they are as yet undetermined (i.e., null). If the current active network attributes 410 have not become available, the procedure progresses to step 608. Otherwise, the procedure progresses to step 610.

At step 608, the learned identity confidence modifiers 418 (FIG. 4) are applied to corresponding current identity confidences 412 with values above a minimum learned modification identity confidence threshold (e.g., 20%). An example procedure for applying learned identity confidence modifiers in accordance with an embodiment of the invention is described below with reference to FIG. 8. Following step 608, the current identity confidences 412 may be utilized, for example, as described above with reference to FIG. 5.

At step 610, active network attribute identity confidence modifiers 416 are applied to each current identity confidence associated with issued active network attributes 406 that match the current active network attributes 410. An example procedure for applying active network attribute identity confidence modifiers in accordance with an embodiment of the invention is described below with reference to FIG. 9. Following step 610, the current identity confidences 412 may be utilized, for example, as described above with reference to FIG. 5.

Figure 7:
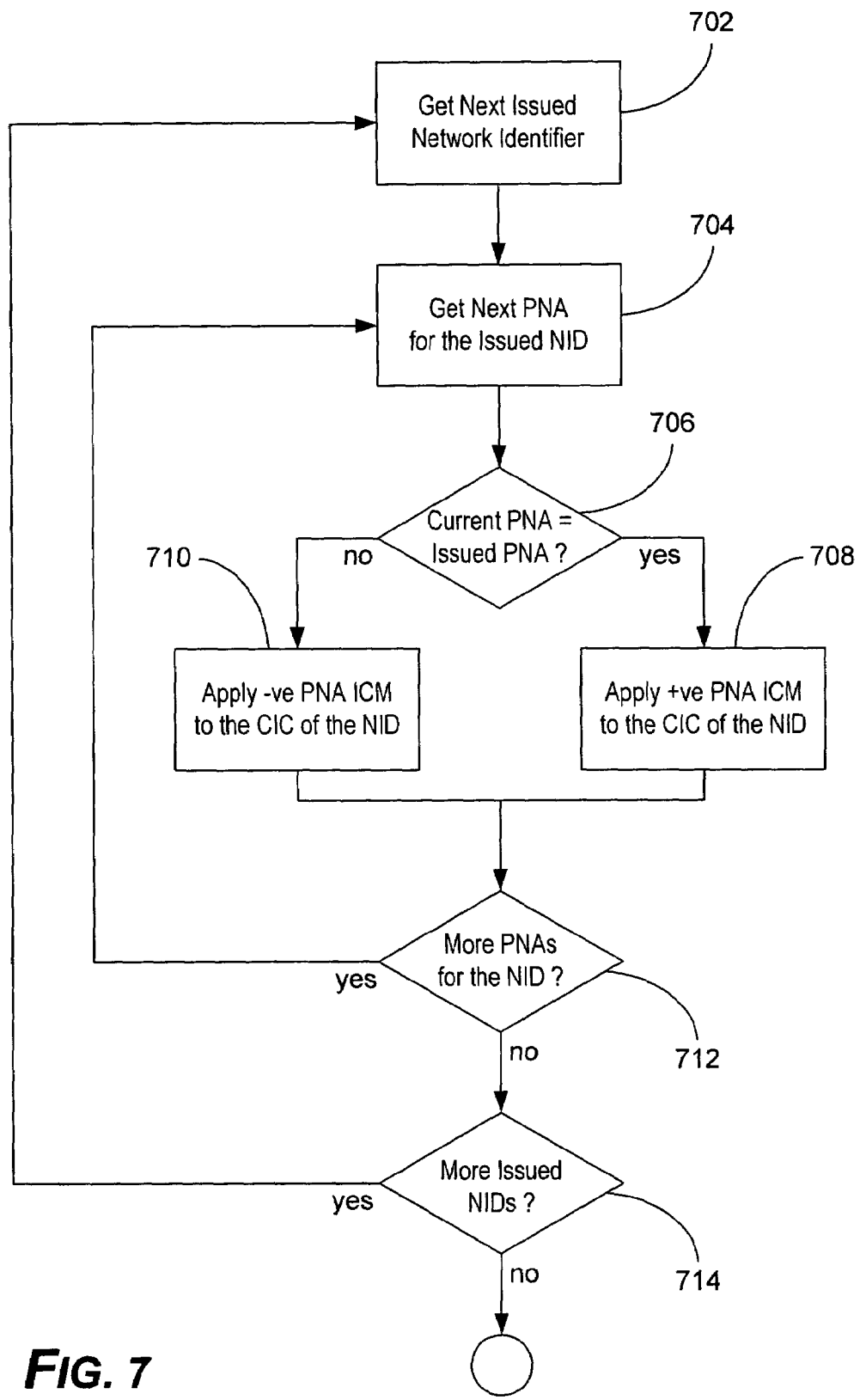
FIG. 7 is a flowchart depicting example steps for applying passive network attribute identity confidence modifiers to current identity confidences in accordance with an embodiment of the invention.

FIG. 7 depicts example steps for applying passive network attribute identity confidence modifiers to current identity confidences in accordance with an embodiment of the invention. At step 702, a next issued network identifier (NID) from the set of issued network identifiers 402 (FIG. 4) is selected as candidate network identifier. Each issued network identifier may be associated with one or more passive network attributes, e.g., $PNA_1$, $PNA_2$ and $PNA_3$. At step 704, a next passive network attribute (PNA) is selected as candidate passive network attribute. The candidate passive network attribute has entries in both the set of current passive network attributes 408 (the current value) and the subset of issued passive network attributes 404 associated with the candidate network identifier (the issued value). For example, $PNA_1$ has a current value in the current passive network attributes 408 and an issued value associated with the candidate network identifier in the issued passive network attributes 404.

At step 706, the candidate passive network attribute entry in the current passive network attributes 408 (FIG. 4) is compared to the candidate passive network attribute entry associated with the candidate network identifier in the issued passive network attributes 404. If there is a match between the current passive network attribute value and the issued passive network attribute value then the procedure progresses to step 708. Otherwise, the procedure progresses to step 710.

Each passive network attribute may be associated with one or more passive network attribute identity confidence modifiers 414 (FIG. 4), for example, passive network attributes $PNA_1$, $PNA_2$ and $PNA_3$ may have associated passive network attribute identity confidence modifiers $PNA\ ICM_1$, $PNA\ ICM_2$ and $PNA\ ICM_3$. A match between current and issued network attributes may increase confidence in a particular computer network identification. Some identity confidence modifiers, that is, positive (+ve) identity confidence modifiers, are intended to be applied as a result of a match between current and issued network attributes. A mismatch between current and issued network attributes may decrease confidence in a particular computer network identification. Some identity confidence modifiers, that is, negative (−ve) identity confidence modifiers, are intended to be applied as a result of a mismatch between current and issued network attributes. Each passive network attribute may be associated with a positive and a negative passive network attribute identity confidence modifier.

At step 708, the positive passive network attribute identity confidence modifier (+ve PNA ICM) associated with the candidate passive network attribute is applied to the current identity confidence associated with the candidate network identifier. At step 710, the negative passive network attribute identity confidence modifier (−ve PNA ICM) associated with the candidate passive network attribute is applied to the current identity confidence associated with the candidate network identifier.

In an embodiment of the invention, identity confidence modifiers 414, 416 and 418 (FIG. 4) may set the current identity confidence to a particular value or to a result of a function of the current identity confidence, for example, to the result of a linear transformation of the current identity confidence. For example, an identity confidence modifier for the IP subnet passive network attribute may be "set current identity confidence to 50%." A positive identity confidence modifier for the authentication domain name passive network attribute may be "add 20% to the current identity confidence." A negative identity confidence modifier for the authentication domain name passive network attribute may be "subtract 20% from the current identity confidence." A negative identity confidence modifier for the IP subnet specification passive network attribute may be "set the current identity confidence to 0%." Identity confidence modifiers 414, 416 and 418 may also be null modifiers, that is, may have no effect when applied to the current identity confidence.

At step 712, it is determined if there are more passive network attribute candidates for the candidate network identifier. If there are more passive network attribute candidates then the procedure returns to step 704. Otherwise, the procedure progresses to step 714. At step 714, it is determined if there are more issued network identifier candidates. If there are more issued network identifier candidates to be considered for the computer network then the procedure returns to step 702. Otherwise, the passive network attribute identity confidence modifiers 414 (FIG. 4) have been applied to the current identity confidences 412. Equivalent procedures are possible, as will be apparent to one of skill in the art, for example, step 706 may be understood as a decision operation for traversing an identity confidence evaluation tree.

Figure 8:
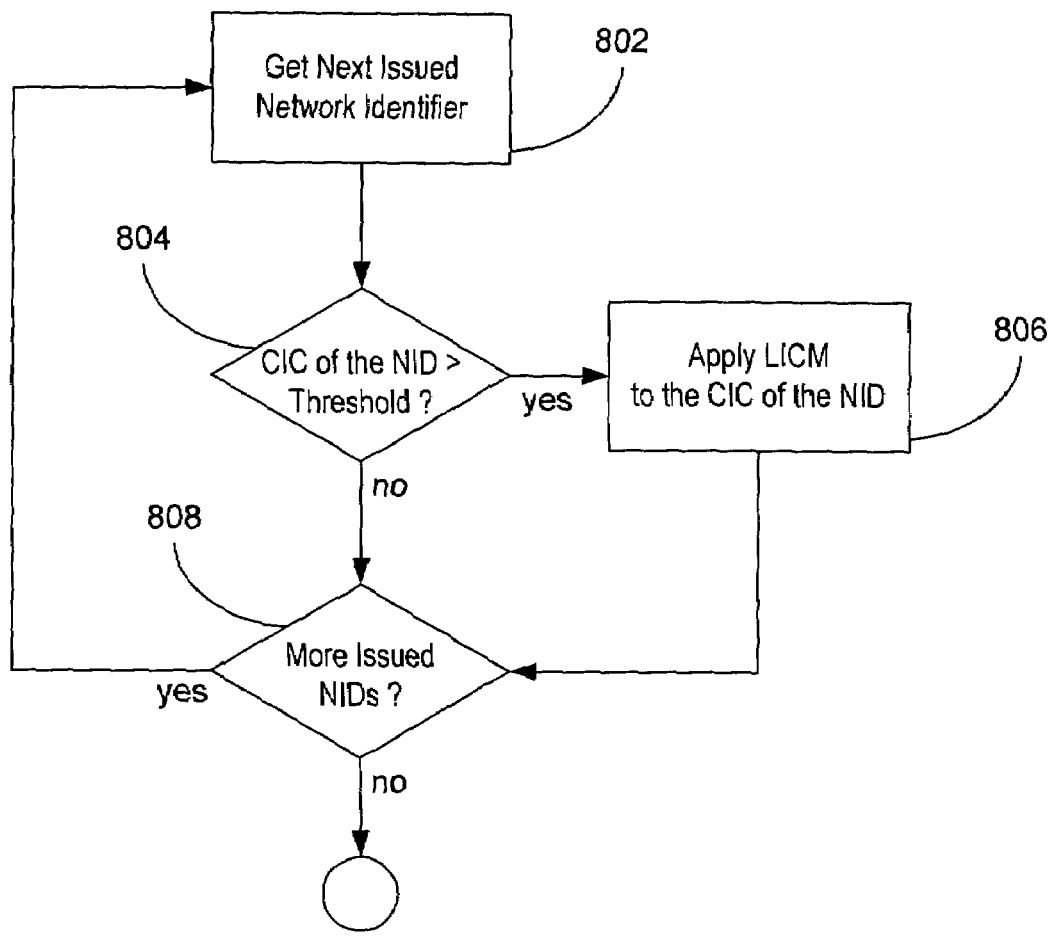
FIG. 8 is a flowchart depicting example steps for applying learned identity confidence modifiers to current identity confidences in accordance with an embodiment of the invention.

FIG. 8 depicts example steps for applying learned identity confidence modifiers to current identity confidences in accordance with an embodiment of the invention. At step 802, a next issued network identifier (NID) from the set of issued network identifiers 402 (FIG. 4) is selected as candidate network identifier. At step 804, it is determined if the current identity confidence of the candidate network identifier is above the minimum learned modification identity confidence threshold. If the current identity confidence of the candidate network identifier is above the minimum learned modification threshold then the procedure progresses to step 806. Otherwise, the procedure progresses to step 808.

Each issued network identifier may have an associated learned identity confidence modifier as well as a current identity confidence. At step 806, the learned identity confidence modifier (LICM) associated with the candidate network identifier is applied to the current identity confidence of the candidate network identifier. In an embodiment of the invention, there is a current identity confidence ceiling, for example, 80%, beyond which the current identity confidence can not be raised by learned identity confidence modifiers. An example procedure for determining learned identity confidence modifiers in accordance with an embodiment of the invention is described below with reference to FIG. 10.

At step 808, it is determined if there are more issued network identifier candidates. If there are more issued network identifier candidates then the procedure returns to step 802. Otherwise, the learned identity confidence modifiers 418 (FIG. 4) have been applied to the current identity confidences 412.

Figure 9:
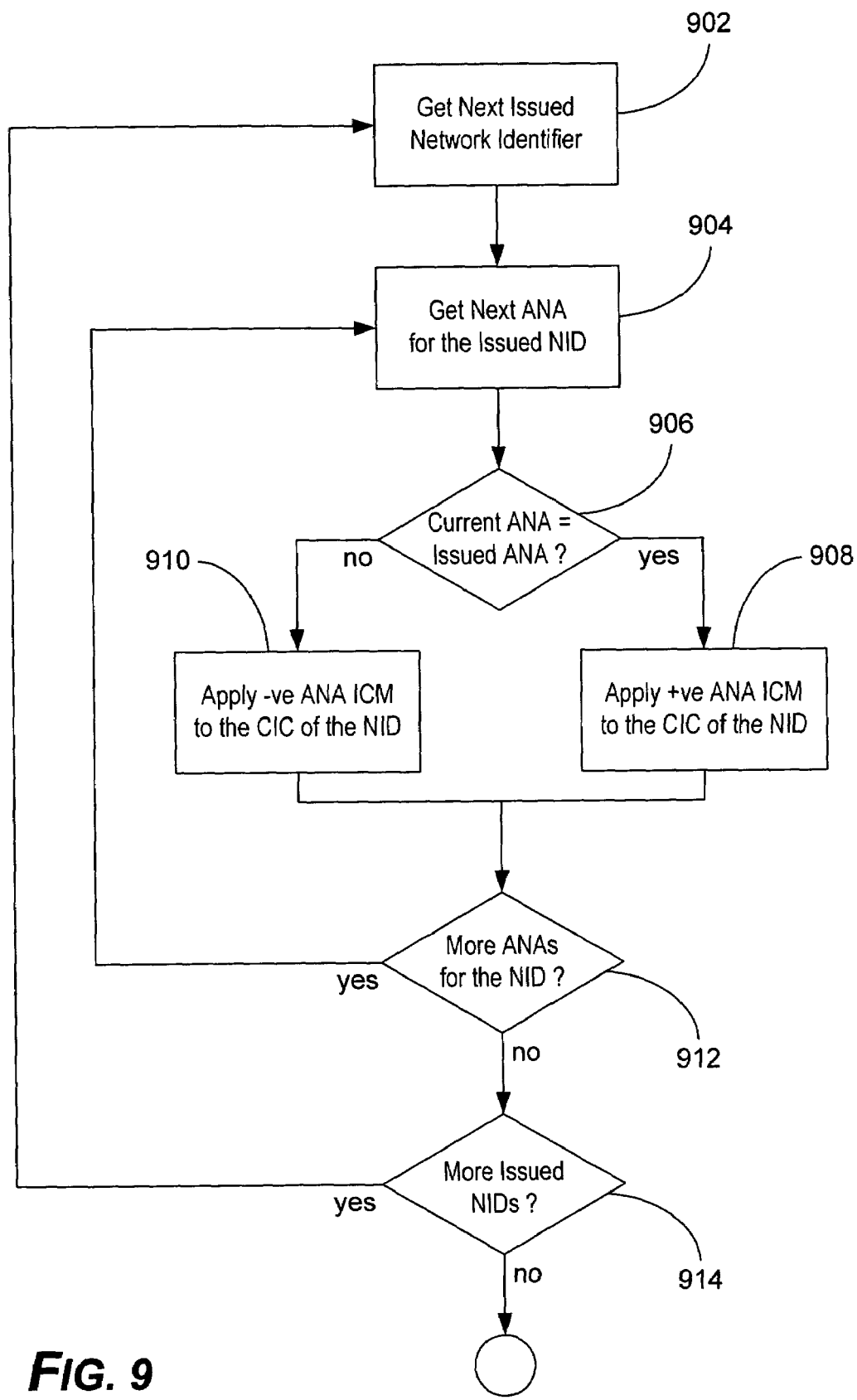
FIG. 9 is a flowchart depicting example steps for applying active network attribute identity confidence modifiers to current identity confidences in accordance with an embodiment of the invention.

FIG. 9 depicts example steps for applying active network attribute identity confidence modifiers to current identity confidences in accordance with an embodiment of the invention. This example procedure has similarities with the example procedure described with reference to FIG. 7. As a result aspects of the description with reference to FIG. 7 may apply to this example and vice versa.

At step 902, a next issued network identifier 402 (FIG. 4) is selected as a candidate network identifier. Each issued network identifier may be associated with one or more active network attributes, e.g., $ANA_1$ and $ANA_2$. At step 904, a next such active network attribute (ANA) is selected as candidate active network attribute. The candidate active network attribute has a current value in the current active network attributes 410 and an issued value associated with the candidate network identifier in the issued active network attributes 406.

At step 906, the current value of the candidate active network attribute is compared to the issued value associated with the candidate network identifier. If there is a match between the current active network attribute and the issued active network attribute then the procedure progresses to step 908. Otherwise the procedure progresses to step 910.

As for passive network attributes, each active network attribute may be associated with one or more active network attribute identity confidence modifiers 416 (FIG. 4). Some active network attribute identity confidence modifiers may be positive active network attribute identity confidence modifiers (+ve ANA ICM), to be applied as a result of a match between current and issued active network attributes. Some active network attribute identity confidence modifiers may be negative active network attribute identity confidence modifiers (−ve ANA ICM), to be applied as a result of a mismatch between current and issued active network attributes. For example, active network attribute $ANA_1$ may be associated with active network attribute identity confidence modifier +ve $ANA\ ICM_1$, and active network attribute $ANA_2$ may be associated with active network attribute identity confidence modifiers +ve $ANA\ ICM_2$ and −ve $ANA\ ICM_2$.

At step 908, a positive active network attribute identity confidence modifier associated with the candidate active network attribute is applied to the current identity confidence associated with the candidate network identifier. At step 910, a negative active network attribute identity confidence modifier associated with the candidate active network attribute is applied to the current identity confidence associated with the candidate network identifier. An example positive active network attribute identity confidence modifier for the authentication state (with a particular remote authentication server) active network attribute is "set the current identity confidence to 100%." An example negative active network attribute identity confidence modifier for the authentication state active network attribute is "set the current identity confidence to 0%."

At step 912, it is determined if there are more active network attribute candidates for the candidate network identifier. If there are more active network attribute candidates then the procedure returns to step 904. Otherwise, the procedure progresses to step 914. At step 914, it is determined if there are more issued network identifier candidates to be considered for the computer network. If there are more issued network identifier candidates then the procedure progresses to step 902. Otherwise, the active network attribute identity confidence modifiers 416 (FIG. 4) have been applied to the current identity confidences 412. As will be apparent to one of skill in the art, procedures equivalent to the described example are possible, for example, step 906 may be understood as a branching decision for traversing an identity confidence evaluation tree.

Passive network attributes for a particular computer network may become available before active network attributes. It may be that high network identity confidence, e.g., 100%, can not be obtained without active network attributes, for example, it may be that passive network attributes are insecure, or it may simply be policy that high confidence network identification includes confirmation by active network attributes. In order to provide accurate network identity confidences independent of active network attributes, learned identity confidence modifiers 418 (FIG. 4) may be applied to current identity confidences 412.

Learned identity confidence modifiers 418 may begin as a default identity confidence modifier, for example, as a null modifier. If active network attributes, once they become available, confirm a particular identity confidence determination made independently of active network attributes then the associated learned identity confidence modifier may be augmented, that is, transformed so that, when applied, the learned identity confidence modifier will result in higher identity confidence values. If active network attributes contradict the particular identity confidence determination made independently of active network attributes then the associated learned identity confidence modifier may be reduced, that is, transformed so that, when applied, the learned identity confidence modifier will result in lower identity confidence values. For example, the learned identity confidence modifier may modify the identity confidence by adding the value of a learned variable to the identity confidence value. To augment such a learned identity confidence modifier, an augmentation constant may be added to the learned variable. To reduce such a learned identity confidence modifier, the augmentation constant may be subtracted from the learned variable. In an embodiment of the invention, learned identity confidence modifiers 418 are adjusted so as to minimize the difference between current identity confidences 412 as determined before and after active network attributes become available for a particular computer network.

Figure 10:
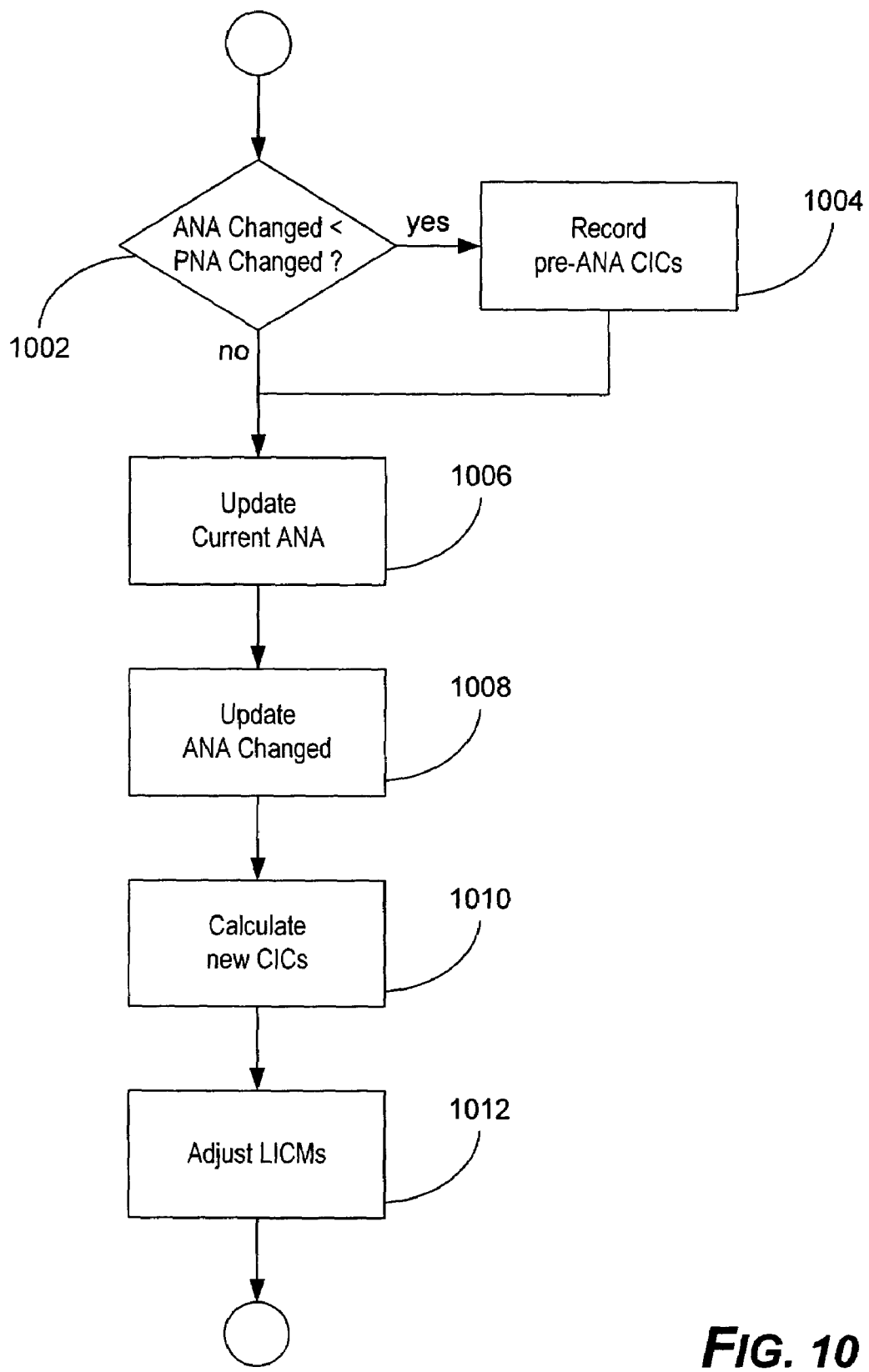
FIG. 10 is a flowchart depicting example steps in accordance with an embodiment of the invention for updating learned identity confidence modifiers as a result of newly available active network attributes.
Figure 11:
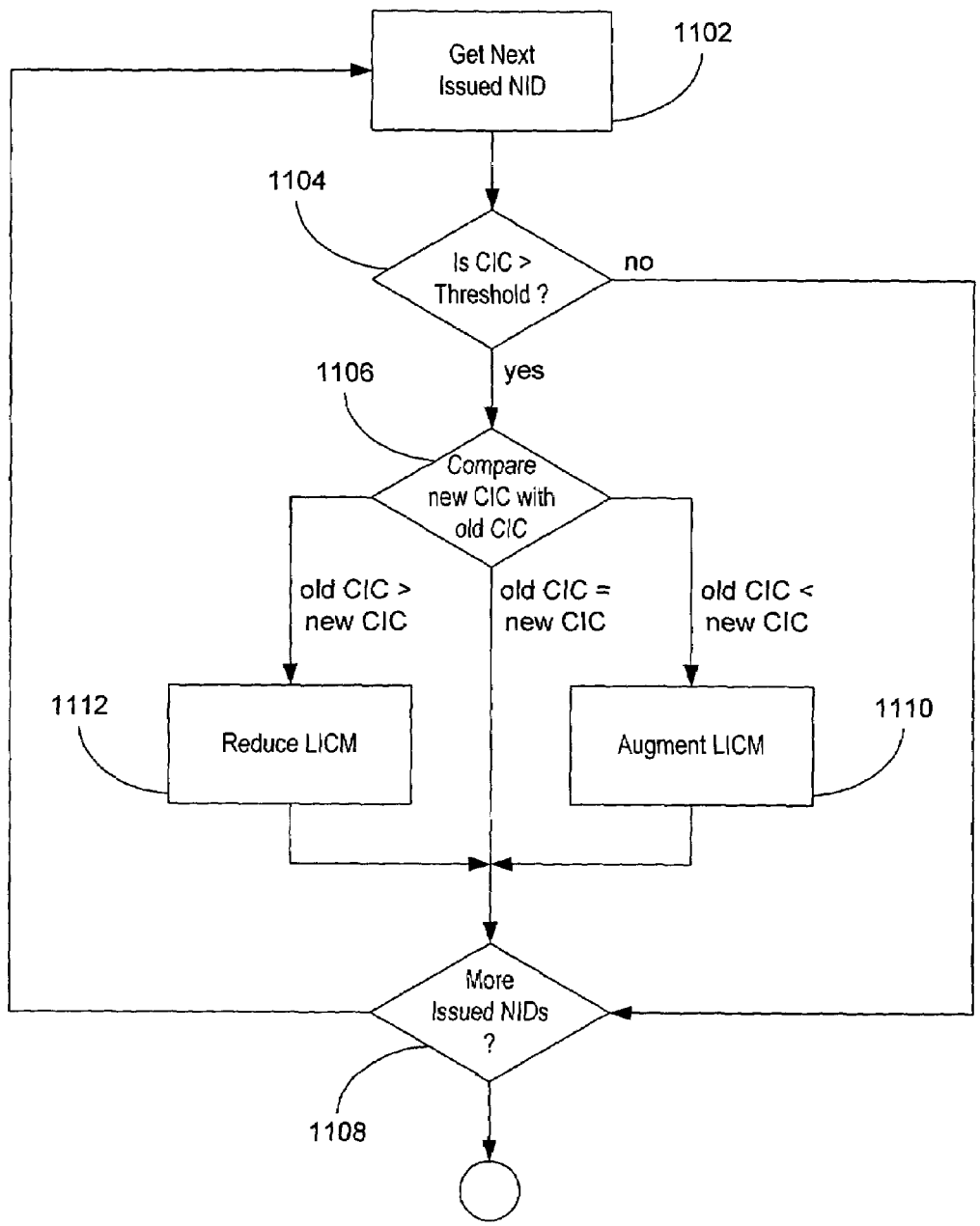
FIG. 11 is a flowchart depicting aspects of FIG. 10 in more detail.

FIG. 10 and FIG. 11 depict example steps in accordance with an embodiment of the invention for updating learned identity confidence modifiers as a result of newly available active network attributes. At step 1002 of FIG. 10, one or more active network attributes have become newly available. For example, the network fingerprinting component 310 (FIG. 3) may be notified by the network location awareness component 308 of the new availability of active network attributes to which the network fingerprinting component 310 subscribes. Before updating the current active network attributes 410 (FIG. 4), it is determined if this is the first time that active network attributes have become newly available since the current identity confidences 412 were last calculated independent of active network attributes.

For example, the network fingerprinting component 310 may compare the active network attribute changed indicators 422 to the passive network attribute changed indicators 420. If each of the active network attribute changed indicators is less (e.g., has an earlier timestamp) than the earliest passive network attribute changed indicator then it may be determined that this is the first time that active network attributes have become newly available since the current identity confidences 412 were last calculated independent of active network attributes. If it is so determined then the procedure progresses to step 1004. Otherwise, the procedure progresses to step 1006.

At step 1004, a copy of the current identity confidences 412 (FIG. 4) that were calculated independent of active network attributes (the pre-ANA CICs) is recorded, for example, in temporary storage. At step 1006, one or more of the current active network attributes 410 are updated with the newly available active network attributes. At step 1008, the corresponding active network attribute changed indicators 422 are updated. In an embodiment of the invention, step 1006 and step 1008 occur as an atomic update operation.

At step 1010, the current identity confidences 412 (FIG. 4) are calculated, for example, as described above with reference to FIG. 5. The resulting current identity confidences 412 (the new CICs) are updated to reflect information provided by the newly available active network attributes. At step 1012, the learned identity confidence modifiers 418 are adjusted by comparing the recorded identity confidences (the old, pre-ANA CICs) with the newly calculated current identity confidences (the new CICs). If particular old and new identity confidence pairs compare poorly (e.g., have a high difference) then the corresponding learned identity confidence modifier may be adjusted so as to reduce the difference in future calculations. Learned identity confidence modifiers associated with particular old and new identity confidence pairs that compare well (e.g., have a low difference) may remain unadjusted.

FIG. 11 depicts example steps for updating learned identity confidence modifiers in accordance with an embodiment of the invention. For example, the steps depicted in FIG. 11 may be utilized to perform step 1012 of FIG. 10. At step 1102, a next issued network identifier is selected as candidate network identifier. At step 1104, the current identity confidence (one of the new CICs) of the candidate network identifier is compared to a minimum learning identity confidence threshold. If the current identity confidence of the candidate network identifier is above the minimum learning identity confidence threshold, e.g., 0%, then the procedure progresses to step 1106. Otherwise the procedure progresses to step 1108.

At step 1106, the newly calculated (i.e., as described above with reference to FIG. 10) current identity confidence of the candidate network identifier is compared to the recorded identity confidence (i.e., the old, pre-ANA CIC) of the candidate network identifier. If the (new) current identity confidence compares well with (e.g., matches) the recorded (old) identity confidence then no adjustment to the learned identity confidence modifier is desirable and the procedure progresses to step 1108. If the recorded identity confidence is less than the current identity confidence then it may be desirable to augment the learned identity confidence modifier and the procedure progresses to step 1110. If the recorded identity confidence is greater than the current identity confidence then it may be desirable to reduce the learned identity confidence modifier and the procedure progresses to step 1112.

At step 1110, the learned identity confidence modifier of the candidate network identifier may be augmented (e.g., linearly) so that, the next time it is applied, a higher current identity confidence results. For example, if the learned identity confidence modifier before step 1110 is "add 20% to the current identity confidence" then after step 1110 the learned identity confidence modifier may be "add 40% to the current identity confidence." At step 1112, the learned identity confidence modifier of the candidate network identifier may be reduced (e.g., linearly) so that, the next time it is applied, a lower current identity confidence results. For example, if the learned identity confidence modifier before step 1112 is "subtract 20% from the current identity confidence" then after step 1112 the learned identity confidence modifier may be "subtract 40% from the current identity confidence."

At step 1108, it is determined if there are more issued network identifier candidates. If there are more candidate network identifiers then the procedure returns to step 1102. Otherwise, the learned identity confidence modifiers 418 (FIG. 4) have been adjusted in accordance with an embodiment of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-readable storage medium comprising:
   computer-executable instructions thereon for performing a method, the method comprising:
   establishing at least one connection to at least one computer network,
      each computer network having at least one network attribute,
      each network attribute associated with at least one identity confidence modifier,
      each identity confidence modifier specifying an identity confidence transformation, and
      each network attribute having a value;
   issuing an issued network identifier for at least one computer network of said at least one computer network; and
   determining an identity confidence for each issued network identifier with respect to at least one current computer network,
      the identity confidence for each issued network identifier comprising a probability of correct identification of the at least one current computer network, and
      the step of determining the identity confidence comprising:
         for each current computer network and each network attribute, applying at least one of said at least one identity confidence modifier associated with the network attribute to the identity confidence of each issued network identifier if the value of the network attribute of the computer network identified by the issued network identifier matches the value of the network attribute of the current computer network,
            wherein applying the at least one of said at least one identity confidence modifier to the identity confidence comprises transforming the identity confidence in accordance with the identity confidence transformation specified by the identity confidence modifier.

2. The computer-readable storage medium of claim 1, wherein the method further comprises responding to a request for an identity of said at least one current computer network with a response, the response comprising:
   at least one issued network identifier; and
   for each issued network identifier in the response, the identity confidence for the issued network identifier determined with respect to said at least one current computer network.

3. The computer-readable storage medium of claim 2, wherein:
each identity confidence has a value, the value ranging from a minimum identity confidence value to a maximum identity confidence value; and
the value of each identity confidence in the response is the maximum identity confidence value.

4. The computer-readable storage medium of claim 2, wherein:
each identity confidence has a value; and
the value of each identity confidence in the response is above a minimum identity confidence response threshold.

5. The computer-readable storage medium of claim 1, wherein each issued network identifier comprises a globally unique identifier (GUID).

6. The computer-readable storage medium of claim 1, wherein each identity confidence modifier specifies a linear identity confidence transformation.

7. The computer-readable storage medium of claim 1, wherein:
each computer network has a plurality of network attributes, the plurality of network attributes comprising:
at least one passive network attribute; and
at least one active network attribute;
each passive network attribute is associated with at least one passive network attribute identity confidence modifier;
each active network attribute is associated with at least one active network attribute identity confidence modifier;
the method further comprises retrieving the value of each active network attribute, the step of retrieving the value of each active network attribute comprising generating network traffic on the computer network that has the active network attribute; and
determining the identity confidence for each issued network identifier with respect to said at least one current computer network further comprises:
for each current computer network and each passive network attribute, applying at least one of said at least one passive network attribute identity confidence modifier associated with the passive network attribute to the identity confidence of each issued network identifier if the value of the passive network attribute of the computer network identified by the issued network identifier matches the value of the passive network attribute of the current computer network; and
for each current computer network and each active network attribute, applying at least one of said at least one active network attribute identity confidence modifier associated with the active network attribute to the identity confidence of each issued network identifier if the value of the active network attribute of the computer network identified by the issued network identifier matches the value of the active network attribute of the current computer network.

8. The computer-readable storage medium of claim 1, wherein:
each computer network has at least one passive network attribute;
each passive network attribute is associated with at least one passive network attribute identity confidence modifier;
each issued network identifier is associated with a learned identity confidence modifier;
the method further comprises retrieving the value of each passive network attribute independent of generating network traffic on the computer network that has the passive network attribute; and
determining the identity confidence for each issued network identifier with respect to said at least one current computer network further comprises:
for each current computer network and each passive network attribute, applying at least one of said at least one passive network attribute identity confidence modifier associated with the passive network attribute to the identity confidence of each issued network identifier if the value of the passive network attribute of the computer network identified by the issued network identifier matches the value of the passive network attribute of the current computer network; and
for each current computer network, applying, to the identity confidence of each issued network identifier, the learned identity confidence modifier associated with the issued network identifier if the identity confidence of the issued network identifier is above a minimum learned modification identity confidence threshold.

9. The computer-readable storage medium of claim 8, wherein:
a first set of identity confidences comprises the identity confidences determined for each issued network identifier with respect to said at least one current computer network;
each computer network has a plurality of network attributes, the plurality of network attributes comprising:
at least one passive network attribute; and
at least one active network attribute;
each active network attribute is associated with at least one active network attribute identity confidence modifier;
the method further comprises:
retrieving the value of each active network attribute, the step of retrieving the value of each network attribute comprising generating network traffic on the computer network that has the active network attribute; and
determining, as a result of at least one active network attribute becoming available, a second set of identity confidences such that determining the second set of identity confidences comprises:
applying at least one active network attribute identity confidence modifier to the second set of identity confidences; and
adjusting the learned identity confidence modifier associated with each issued network identifier so that if the first set of identity confidences were to be re-determined then differences between a re-determined first set of identity confidences and the second set of identity confidences would be minimized.

10. A computerized system, comprising a network fingerprinting component configured to, at least:
issue at least one network identifier for at least one computer network;
maintain a set of issued network identifiers;
maintain a set of current identity confidences, the set of current identity confidences comprising an identity confidence for each issued network identifier with respect to at least one current computer network, the identity confidence for each issued network identifier comprising a probability of correct identification of the at least one current computer network;

maintain a set of identity confidence modifiers, the set of identity confidence modifiers comprising at least one identity confidence modifier for each network attribute in the set of current network attributes, each at least one identity confidence modifier specifying a transformation of at least one identity confidence; and apply at least one identity confidence modifier to the at least one identity confidence, comprising transforming the at least one identity confidence in accordance with the transformation specified by the at least one identity confidence modifier.

11. The computerized system of claim 10, wherein the network fingerprinting component is further configured to, at least:

maintain a set of issued network attributes, the set of issued network attributes comprising, for each issued network identifier in the set of issued network identifiers, at least one network attribute of a computer network identified by the issued network identifier; and maintain a set of current network attributes, the set of current network attributes comprising at least one network attribute of each current computer network.

12. The computerized system of claim 10, wherein:

each computer network has a plurality of network attributes, the plurality of network attributes comprising:
   at least one passive network attribute; and
   at least one active network attribute;
each network attribute has a value;
retrieving the value of each active network attribute comprises generating network traffic on the computer network that has the active network attribute; and
the network fingerprinting component is further configured to, at least:
   maintain a set of issued passive network attributes, the set of issued passive network attributes comprising, for each issued network identifier in the set of issued network identifiers, at least one passive network attribute of a computer network identified by the issued network identifier;
   maintain a set of issued active network attributes, the set of issued active network attributes comprising, for each issued network identifier in the set of issued network identifiers, at least one active network attribute of a computer network identified by the issued network identifier;
   maintain a set of current passive network attributes, the set of current passive network attributes comprising at least one passive network attribute of each current computer network; and
   maintain a set of current active network attributes, the set of current active network attributes comprising at least one active network attribute of each current computer network.

13. The computerized system of claim 12, wherein the network fingerprinting component is further configured to, at least:

maintain a set of passive network attribute identity confidence modifiers, the set of passive network attribute identity confidence modifiers comprising at least one passive network attribute identity confidence modifier for each passive network attribute in the set of current passive network attributes;

maintain a set of active network attribute identity confidence modifiers, the set of active network attribute identity confidence modifiers comprising at least one active network attribute identity confidence modifier for each active network attribute in the set of current active network attributes;

apply at least one passive network attribute identity confidence modifier to at least one identity confidence; and apply at least one active network attribute identity confidence modifier to said at least one identity confidence.

14. The computerized system of claim 13, wherein the network fingerprinting component is further configured to, at least:

maintain a set of learned identity confidence modifiers, the set of learned identity confidence modifiers comprising at least one learned identity confidence modifier for each issued network identifier in the set of issued network identifiers; and apply at least one learned identity confidence modifier to at least one identity confidence.

15. The computerized system of claim 14, wherein the network fingerprinting component is farther configured to, at least, adjust the set of learned identity confidence modifiers so as to minimize differences between a first set of current identity confidences and a second set of current identity confidences, the first set of current identity confidences determined before retrieving active network attributes for said at least one current computer network, and the second set of current identity confidences determined after retrieving active network attributes for said at least one current computer network.

16. The computerized system of claim 13, wherein the network fingerprinting component is further configured to, at least:

for each issued network identifier in the set of issued network identifiers and for each passive network attribute in the set of current passive network attributes, apply at least one of said at least one passive network attribute identity confidence modifier for the passive network attribute to the identity confidence for the issued network identifier if the value of the passive network attribute in the set of current passive network attributes matches the value of the passive network attribute for the issued network identifier in the set of issued passive network attributes; and for each issued network identifier in the set of issued network identifiers and for each active network attribute in the set of current active network attributes, apply at least one of said at least one active network attribute identity confidence modifier for the active network attribute to the identity confidence for the issued network identifier if the value of the active network attribute in the set of current active network attributes matches the value of the active network attribute for the issued network identifier in the set of issued active network attributes.

17. The computerized system of claim 10, wherein each identity confidence modifier specifies a linear transformation of the identity confidence.

18. The computerized system of claim 10, wherein each network identifier is a globally unique identifier (GUID).

* * * * *